United States Patent [19]
Ben-Eli

[11] Patent Number: 6,084,891
[45] Date of Patent: Jul. 4, 2000

[54] BI-DIRECTIONAL CHANNEL ANALYSIS

[75] Inventor: David Ben-Eli, Modiin, Israel

[73] Assignee: D.S.P.C. Technologies Ltd., Givat Shmuel, Israel

[21] Appl. No.: 08/997,603

[22] Filed: Dec. 23, 1997

[30] Foreign Application Priority Data

May 22, 1997 [IL] Israel .......................................... 120898

[51] Int. Cl.[7] .................................................... H04J 3/06
[52] U.S. Cl. .......................... 370/513; 370/514; 375/565
[58] Field of Search .................................... 370/503, 509, 370/510, 511, 512, 513, 514; 375/354, 305

[56] References Cited

U.S. PATENT DOCUMENTS

| | | | |
|---|---|---|---|
| 4,763,339 | 8/1988 | Sutphin et al. | 375/365 |
| 5,007,088 | 4/1991 | Ooi et al. | 380/46 |
| 5,101,401 | 3/1992 | Suzuki et al. | 370/241 |
| 5,155,742 | 10/1992 | Ariyavisitakul et al. | |
| 5,241,545 | 8/1993 | Kazecki et al. | 370/337 |
| 5,263,026 | 11/1993 | Parr et al. | 370/350 |
| 5,276,709 | 1/1994 | Kazawa et al. | 375/242 |
| 5,333,148 | 7/1994 | Tsubaki et al. | 375/229 |
| 5,355,250 | 10/1994 | Dent et al. | |
| 5,363,412 | 11/1994 | Love et al. | 375/341 |
| 5,408,504 | 4/1995 | Ostman | 375/354 |
| 5,619,507 | 4/1997 | Tsuda | 370/350 |
| 5,627,864 | 5/1997 | Yoo | 375/362 |
| 5,706,314 | 1/1998 | Davis et al. | 375/340 |
| 5,740,204 | 4/1998 | Nagashima | 375/341 |
| 5,757,845 | 5/1998 | Fukawa et al. | 375/200 |
| 5,818,876 | 10/1998 | Love | 375/341 |

OTHER PUBLICATIONS

"Bi-directional Equalization for TDMA Communication Systems over Land Mobile Radio Channels", Yow–Jong Liu, Globecom, 1991, IEEE, pp. 1458–1462.

"Equalization of Hard–Limited Slowly–Faded Multipath Signal Using a Phase Equalizer with Time–Reversal Structures", Sirikiat Ariyavisitakul, IEEE Journal on Selected Areas in Communications, vol. 10, No. 3, Apr. 1992, pp. 589–598.

"A Decision Feedback Equalizer with Time–Reversal Structures", Sirikiat Ariyavisitakul, IEEE Journal on Selected Areas in Communications, vol. 10, No. 3, Apr. 1992, pp. 599–613.

"A Soft–Output Bidirectional Decision Feedback Equalization Technique for TDMA Cellular Radio", Yow–Jong Liu, IEEE Journal on Selected Areas in Communications, vol. 11, No. 7, Sep. 1993, pp. 1034–1045.

*Primary Examiner*—Ajit Patel
*Assistant Examiner*—Bob A. Phunkulh
*Attorney, Agent, or Firm*—Skjerven, Morrill, MacPherson, Franklin & Friel LLP

[57] ABSTRACT

A method for analyzing the channel using the preceding slot synchronization sequence is provided. The method of the invention is for operating a receiver receiving a signal frame in a dynamic channel wherein the signal frame includes a plurality of slots, each including a plurality of data bits. Each of the slots further includes a synchronization sequence wherein at least a predetermined one of the slots is assigned for the receiver. The preceding slot following the receiver assigned slot includes a varying synchronization sequence which is selected from a group of predetermined synchronization sequences postulates. The method includes the steps of calculating from the preceding slot synchronization sequence an estimated taps value for each of the synchronization sequence postulates, calculating from the preceding step synchronization sequence a log likelihood metric value $C(\underline{y},\underline{h})$ for each of the synchronization sequence postulates and selecting the synchronization word postulate having the best metric value.

13 Claims, 5 Drawing Sheets

BI-DIRECTIONAL CHANNEL ANALYSIS

FIELD OF THE INVENTION

The present invention relates to methods for signal detection in general and to methods for signal detection using known preambles in particular.

BACKGROUND OF THE INVENTION

Methods for detecting a signal and evaluating a channel using a known preamble, are known in the art. Such methods are used in timed framed communication methods such as TDMA communication standard, CDMA communication standard, and the like.

Reference is made to FIG. 1 which is a schematic illustration of a timed framed TDMA sequence, referenced 1, known in the art. Frame sequence 1 includes a plurality of slots 2, 4, 6, 8, 10 and 11. Each of these slots includes bits of data, lasting a predetermined period of time.

In TDMA, several users may use a predetermined communication channel, each at predetermined intervals in time. In the present example, slot 2 is assigned to a first user, slot 4 is assigned to a second user, and so on.

According to common TDMA standards, such as IS-136, IS-54, RCR-27, the preamble (i.e. the first few bits of information) of each slot represents a known synchronization sequence, also known as a sync-word. Each of slots 2, 4, 6, 8 and 10 has a sync-word 12, 14, 16, 18 and 20, respectively.

Sync-words are used to determine what the channel looks like with regard to several aspects such as amplitude, phase, timing, frequency offset, reflections which produce echoes, represented by channel taps, distortions, interference and the like.

Multiple channel taps cause inter-symbol interference. For example, the value of a sample $s_i$ sampled at the output of the multi-path channel, is given by $$s_i = \Sigma_{n=-L_1}^{L_2} h_n a_{i-n}$$

wherein the $a_i$ are the transmitted samples ($-\infty < i < \infty$); and $h_n$ are the gains of the channel taps ($-L_1 \leq n \leq L_2$). $L_1$ and $L_2$ define the length of channel memory which, in turn, defines the number of neighboring symbols which affect each sample.

Conventional methods use the sync-word of each slot to determine the appropriate synchronization to this slot. Thus, the receiver of the first user, receiving slot 2, will analyze sync-word 12 (S1), determine the channel characteristics and proceed analyzing the rest of slot 2, accordingly.

It will be appreciated that a communication channel may develop in time, which affects the form of a received slot. Thus, an analysis, based on a sync-word at the beginning of a slot, might not be accurate for the last part of the slot.

Accordingly, conventional receivers execute dynamic tracking procedures, which track the channel development in time, while decoding the data contained therein. Temporary fading of a channel may cause considerable degradation in such channel tracking procedures.

Another method known in the art analyzes the channel of a received slot according to the sync-word of the slot and the sync-word of the next adjacent slot. For example, the receiver of the first user, receives slot 2 as well as the sync-word 14 of slot 4 and analyzes the channel from sync-word 12 (S1) and 14 (S2).

Analyzing the channel for slot 2 using sync-word 12 (S1), combined with forward in time channel tracking, is also called forward analysis. Analyzing the channel for slot 2 using sync-word 14 (S2), combined with backward in time channel tracking, is also called backwards analysis. According to prior art methods, this can be performed only when S1 and S2 are known, fixed sequences.

It will be appreciated that in some communication standards, such as TDMA IS-54, IS-136, RCR-27 and the like, the sync-word of the next slot, is not a fixed predetermined sequence, which make the above prior art methods inefficient.

These TDMA standard define a frame which includes six slots. TDMA standard also defines two modes of channel usage. A first mode is called half-rate, in which a user is assigned one slot (i.e. every sixth frame is reserved for his use). A second mode is called full-rate, in which a user is assigned two slots in a frame (i.e., every third slot).

Reference is now made to FIG. 2 which is a schematic illustration of a combined full-rate half-rate frame TDMA sequence, generally referenced 48. Frame 48 includes a plurality of data slots, 50, 52, 54, 56, 58, 60 and 62, each having a preamble 70, 72, 74, 76, 78, 80 and 82, respectively.

The first six slots define a frame, operative for a number of users, which will be repeated further in the frame. This frame is assigned to two half-rate users and two full-rate users.

Slots 54 and 60 are assigned to the first and second half-rate users, respectively. Slots 50 and 56 are assigned to the first full-rate user and slots 52 and 58 are assigned to the second full-rate user.

In the present example, preambles 70 and 76 of slots 50 and 56 which are both assigned to the first full-rate user, have the same sync-word S1. Preambles 72 and 78 of slots 52 and 58 which are both assigned to the second full-rate user, have the same sync-word S2. Preambles 74 and 80 of slots 54 and 60, each assigned to a different half-rate user, have different sync-word S3 and S6, respectively.

Accordingly, S1 is followed by S2, while S2 is followed by either S3 or S6.

Yow-Jong Liu, "Bi-Directional Equalization Technique for TDMA Communication systems over Land Mobile Radio Channels", *GLOBECOM* 1991 IEEE, p 1458–1462, describes a method for using the sync-word of the next slot which decodes the data of a slot according to its sync-word (forward analysis) and according to the sync-word of the next slot (backward analysis). When the sync-word of the next slot may have more than one option, then the data of the current slot is backward analyzed according to each of these options, thereby providing a plurality of data hypotheses. Finally, the most likely hypothesis is selected.

It will be appreciated that an analysis according to this method requires a considerable amount of computing resources and power, which can be critical for mobile communication devices having limited power resources.

SUMMARY OF THE PRESENT INVENTION

It is an object of the present invention to provide a novel method for analyzing a communication channel using slot preambles, which overcomes the disadvantages of the prior art.

In accordance with a preferred embodiment of the present invention, there is thus provided a method for analyzing the channel using the preceding slot synchronization sequence.

The method of the invention is for operating a receiver receiving a signal frame in a dynamic channel wherein the signal frame includes a plurality of slots, each including a plurality of data bits. Each of the slots further includes a synchronization sequence wherein at least a predetermined one of the slots is assigned for the receiver.

The preceding slot following the receiver assigned slot includes a varying synchronization sequence which is selected from a group of predetermined synchronization sequences postulates. The method includes the steps of:

calculating from the preceding slot synchronization sequence an estimated taps value for each of the synchronization sequence postulates;

calculating from the preceding step synchronization sequence a log likelihood metric value C($\underline{y},\underline{h}$) for each of the synchronization sequence postulates; and selecting the synchronization word postulate having the best metric value.

According to another aspect of the invention, the likelihood metric value C($\underline{y},\underline{h}$) is calculated from an expression $$\sum_{m=K}^{N_s} \left| y_m - \sum_{k=1}^{K} h_k \cdot s_{m-k} \right|^2,$$

wherein y represents the signal samples, h represents the channel taps, s represents the synchronization sequence postulates and m is a time index.

According to another aspect of the invention, the likelihood metric value C($\underline{y},\underline{h}$) is calculated from an expression $$\sum_{m=K}^{N_s} |y_m - \underline{h}_m \cdot s_m|^2.$$

According to a further aspect of the invention, h is calculated from an expression selected from the group consisting of:

$$\left( \sum_{l=K}^{N_s} s_1^* s_1^t \right)^{-1} \sum_{l=K}^{N_s} s_l^* y_l; \text{ and}$$

$$\frac{1}{N_s - K} \sum_{l=K}^{N_s} s_1^* y_l,$$

wherein $N_s$ is the number of symbols in the synchronization sequence and K is the assumed number of channel taps.

The method of the invention may further include the steps of:

calculating a reliability value; and determining that the selected synchronization sequence postulate reliable.

The reliability value can be calculated from the difference between the log likelihood value of the selected synchronization sequence postulate and the log likelihood values of the rest of the synchronization sequence postulates of the group of predetermined synchronization sequence postulates.

The selected synchronization sequence postulate is determined reliable when the reliability value exceeds a predetermined threshold value.

According to yet another aspect of the invention, at least one synchronization sequence postulate of the group of predetermined synchronization sequence postulates is assigned for the preceding slot and excluded from at least another preceding slot, wherein the reliability value is calculated from comparing the selected synchronization sequence postulate with the at least one synchronization sequences postulate.

The method of the invention may further include the step of analyzing the channel according to the selected synchronization sequence postulate, thereby producing channel analysis.

In addition, the method of the invention may further include the step of analyzing the channel according to the selected synchronization sequence postulate and the receiver assigned slot synchronization sequence, thereby producing channel analysis.

Moreover, the method of the invention may further include the step of decoding the data according to the various channel analyses.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention provides a method which overcomes the disadvantages of the prior art by determining each next slot sync-word as a postulate, analyzing each of these postulates, selecting the most likely one and then analyzing the data of the current slot forward according to its sync-word, and backward according to the selected next slot sync-word.

Figure 3:
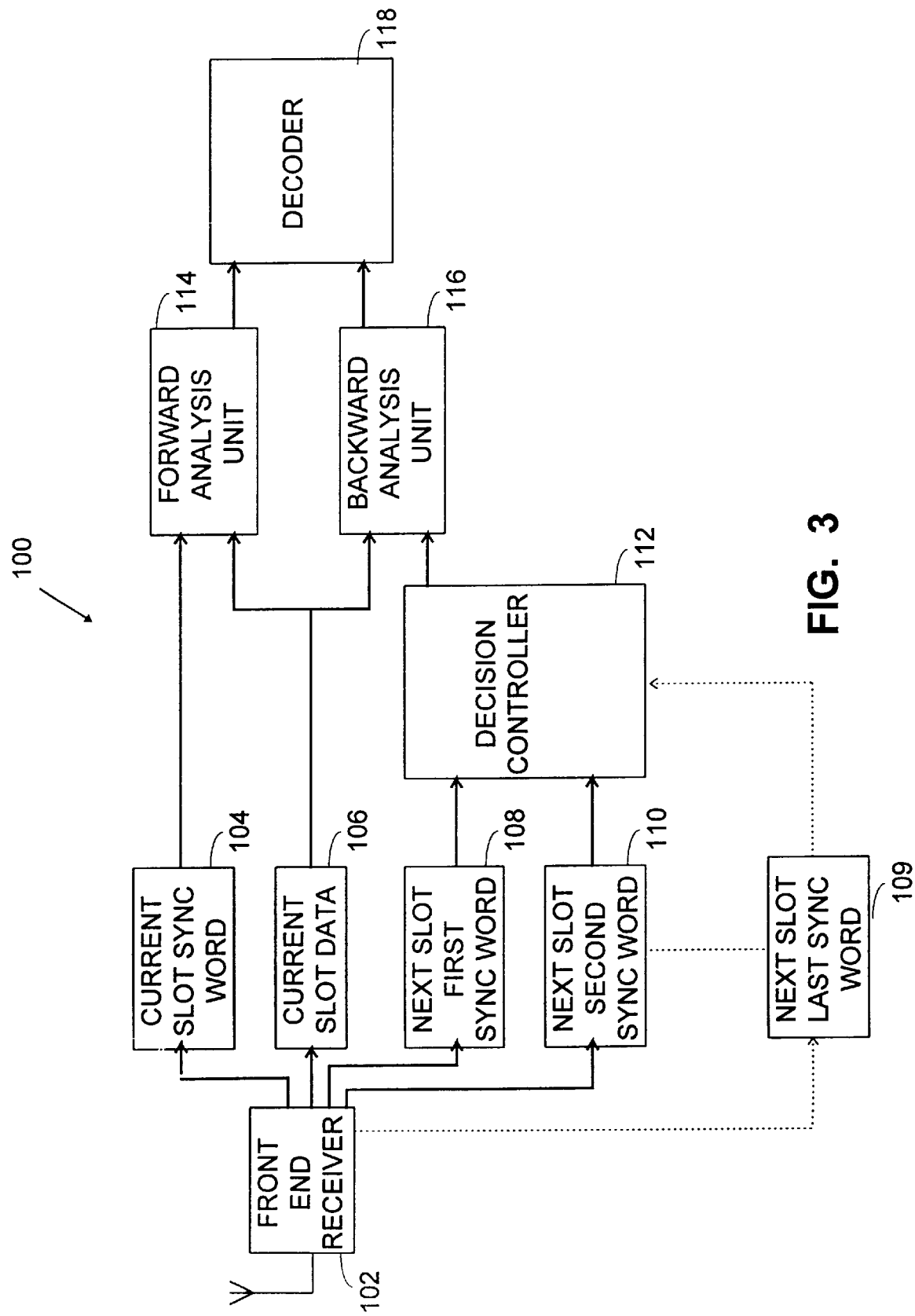
FIG. 3 is a schematic illustration of a system for analyzing a TDMA signal slot according to multiple sync-words, constructed and operative in accordance with a preferred embodiment of the present invention.

References are made to FIG. 3, which is a schematic illustration of a system for analyzing a TDMA signal slot according to multiple sync-words, generally referenced 100, constructed and operative in accordance with a preferred embodiment of the present invention.

System 100 includes a front end receiver unit 102, a current slot sync-word analysis unit 104, a current slot data buffer 106, a next slot first sync-word analysis unit 108 and a next slot second sync-word analysis unit 110, all of which are connected to the front end receiver unit 102.

System 100 optionally includes additional next slot N sync-word analysis units represented by a next slot last sync-word analysis unit 109 and dotted lines connecting it to the next slot second sync-word analysis unit 110, the decision controller 112 and the front end receiver 102.

System 100 further includes a decision controller 112 connected to units 108 and 110, a forward analysis unit 114 connected to units 104 and 106, a backward analysis unit connected 116 to buffer 106 and the decision controller 112 and a decoder 118 connected to the forward analysis unit 114 and to the backward analysis unit 116.

The front end receiver unit 102 receives and samples a TDMA slot as well as the sync-word of the next slot. The front end receiver unit 102 then provides the sync-word of the current slot to the current slot sync-word analysis unit 104, the data of the current slot to the current slot data buffer 106 and the sync-word of the next slot to the next slot sync-word analysis units 108 and 110.

The current slot sync-word analysis unit 104 analyzes the sync-word so as to determine the appropriate channel according to which the data stored in the current slot data buffer 106 is to be forward analyzed.

The next slot sync-word analysis unit 108 analyzes the sync-word of the next slot according to a first sync-word postulate, which is optional for the next slot sync-word, thereby producing a respective likelihood value. The next slot second sync-word unit analysis 110 analyzes the sync-word of the next slot according to a second postulate, which is also optional for the next slot sync-word, thereby producing a respective likelihood value. Each of units 108 and 110 also produces a channel analysis according to each of the postulates, respectively.

Units 108 and 110 then provide the results of their analysis to the decision controller 112, which in turn, determines and selects the postulates which has a better likelihood value.

Then, the decision controller 112 provides the selected sync-word postulate to the backward analysis unit 116, as the next slot sync-word. At the same time, the current slot data buffer 106 provides the data to the backward analysis unit 116. Then, the backward analysis unit 116 analyzes the data according to the selected sync-word of the next slot.

At the same time the current slots sync-word analysis unit 104 provides an analysis of the channel according to the current sync-word and provides it to the forward analysis unit 114. The current slot data buffer 106 also provides the current slot data to the forward analysis unit 114.

The forward analysis unit 114 analyzes the current slot data according to the channel analysis provided by the current slot sync-word analysis unit 104.

The forward analysis unit 114 and the backward analysis unit 116 provide the analysis of the data to the decoder 118 which, in turn, decodes the data according to forward and backward data analysis.

Figure 4:
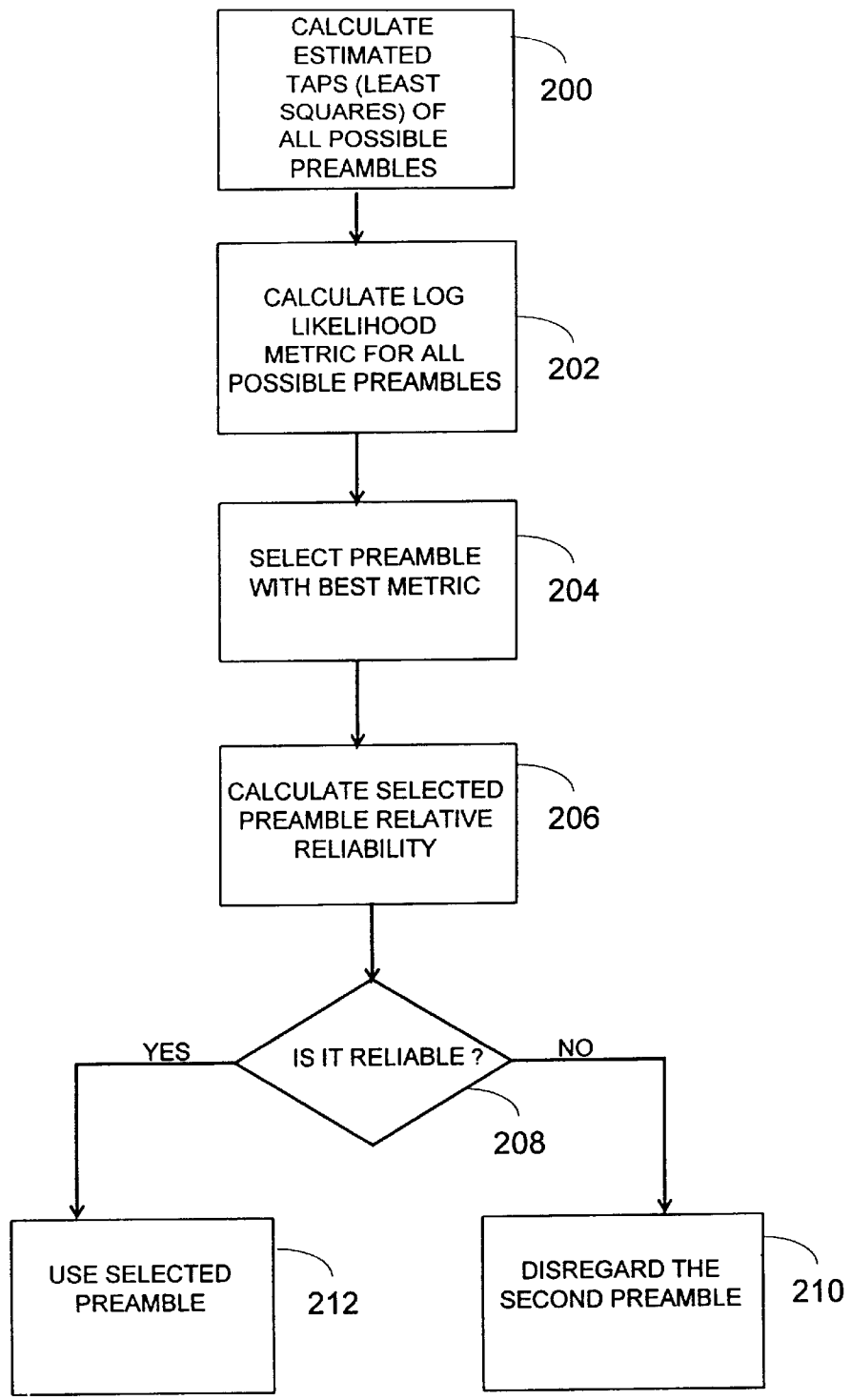
FIG. 4 is a schematic illustration of a method for operating the system of FIG. 3, so as to analyze and select between the two postulates available for the next slot sync-word, operative in accordance with another embodiment of the present invention.

Reference is now made to FIG. 4 which is a schematic illustration of a method for operating system 100, so as to analyze and select between the two postulates available for the next slot sync-word, operative in accordance with another embodiment of the present invention.

In step 200, units 108 and 110 calculate an estimated taps value for each of the sync-word postulates.

In step 202, units 108 and 110 calculate a log likelihood metric for each of the next slot sync-word postulates.

In step 204, the decision controller 112 selects the sync-word postulate with the best metric and proceeds to step 206. An example for such a log likelihood calculation is given by the expression:

$$C(\underline{y}, \underline{h}) = \sum_{m=k}^{N_s} \left| y_m - \sum_{k=1}^{K} h_k \cdot s_{m-k} \right|^2 = \sum_{m=k}^{N_s} |y_m - \underline{h}_m \cdot \underline{s}_m|^2$$

wherein y represents the signal samples, h represents the channel taps, which relate to channel reflections, s represents the sync-word postulates and m is a time index. This expression represents the Euclidean distance between the received samples and the samples which were estimated, assuming a determined next frame sync-word.

The expression $$\sum_{k=1}^{K} h_k - s_{m-k}$$

represents, generally, a convolution of the channel and the sync-word.

h can be calculated according to a least squares estimation:

$$\underline{h}_{opt} = \left( \sum_{l=K}^{N_s} s_l^* s_l^t \right)^{-1} \sum_{l=K}^{N_s} s_l^* y_l$$

or a simple correlation:

$$\underline{h}_{opt} = \frac{1}{N_s - K} \sum_{i=k}^{N_s} s_i^* y_i$$

wherein $N_s$ is the number of symbols in the sync-word and K is the assumed number of channel taps.

In step 206, the decision controller 112 further calculates a reliability value for the selected next slot sync-word. This step will be further discussed in detail hereinbelow.

In step 208, the decision controller 112 determines if the decision of selecting the selected next slot sync-word is to be regarded as reliable. If so, the decision controller 112 proceeds to step 212 where it provides the backward analysis unit 116 with a selected next slot sync-word. Otherwise, the decision controller 112 provides a command to the backward analysis unit 116, to disregard the second sync-word and not perform any backward analysis for this slot.

Disregarding of the next slot sync-word may occur in a situation where this next slot sync-word is subject to deep fading of the channel. Thus the data of this next slot sync-word may be corrupt and therefore invalid.

Figure 5:
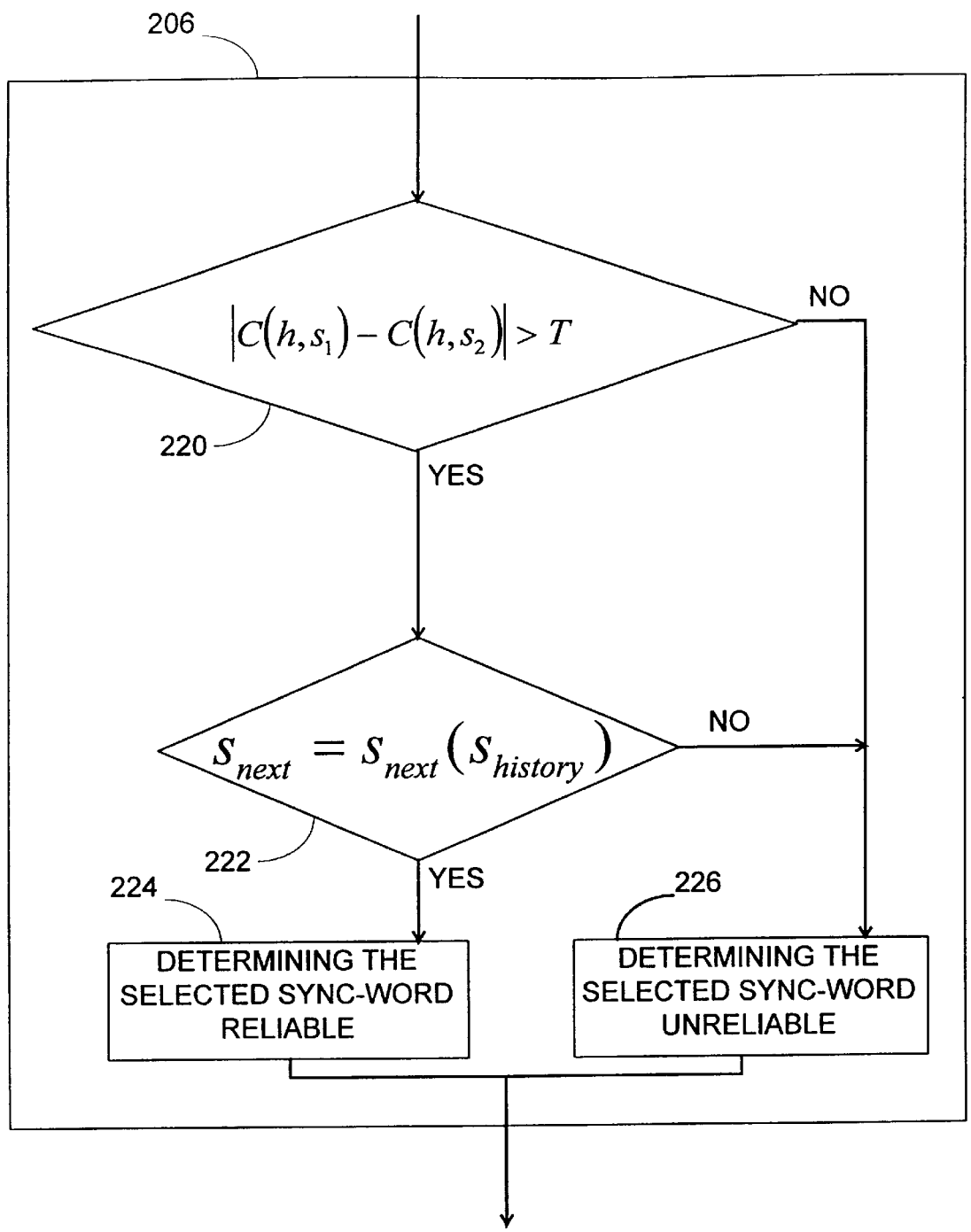
FIG. 5 is a schematic illustration in detail of a portion of the method of FIG. 4.

Reference is now made to FIG. 5 which is a schematic illustration in detail of step 206 of the method of FIG. 4.

In step 220, the decision controller 112 detects if the likelihood value of the selected sync-word is substantially greater than the likelihood value of the non-selected sync-word. If the likelihood values are too close, than one is not likely to be preferable over the other. In this case, the likelihood values are often a result of noise rather than distinctive values. In such a case, the decision controller 112 determines the selected sync-word non-reliable (step 226). Otherwise, the decision controller 112 proceeds to step 222.

Figure 1:
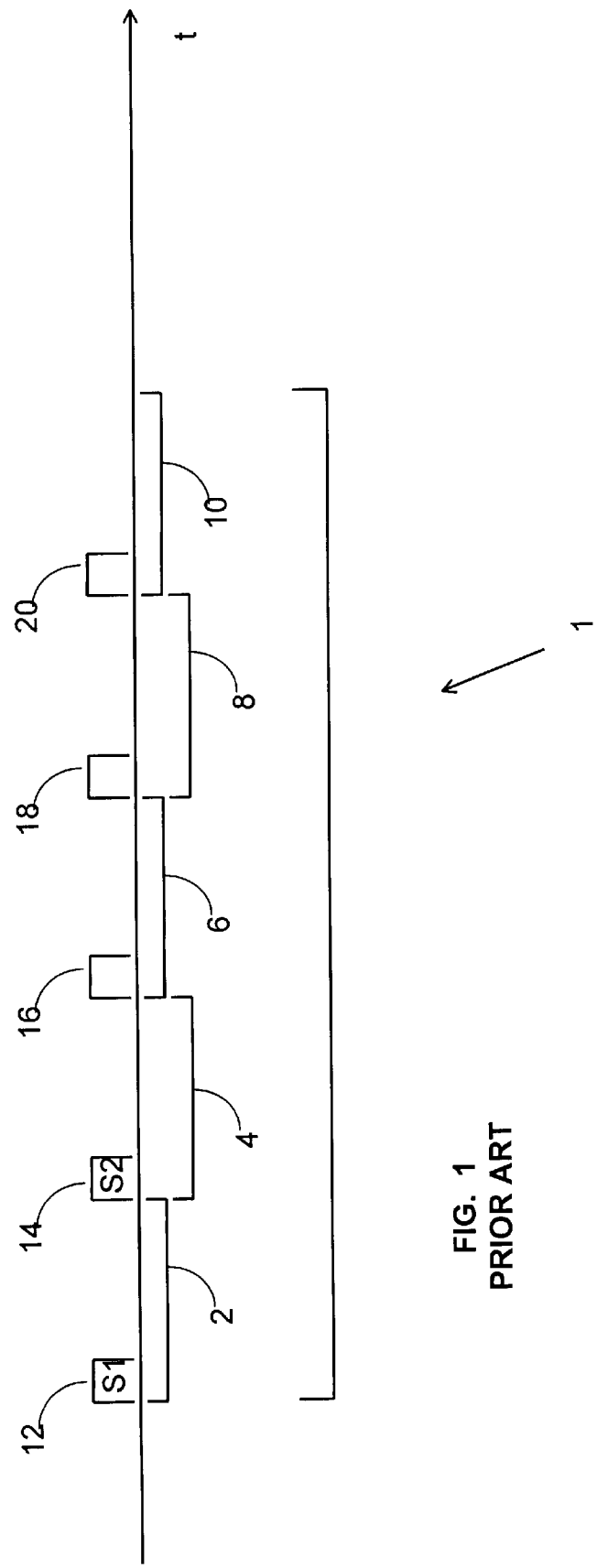
FIG. 1 is a schematic illustration of a TDMA frame, known in the art.
Figure 2:
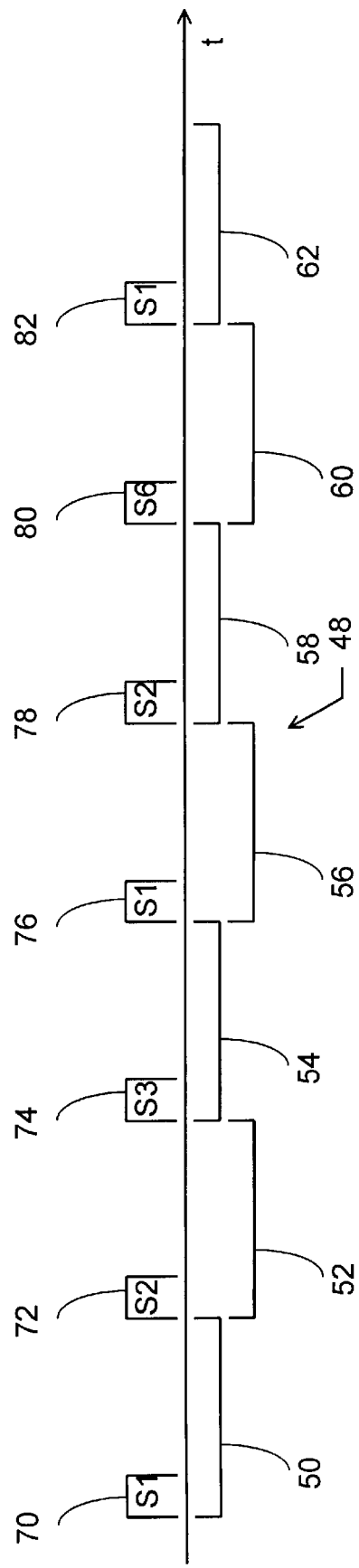
FIG. 2 is a schematic illustration of a combined full-rate half-rate TDMA frame, known in the art.

In step 222, the decision controller 112 detects if the selected next slot sync-word is logically correct, according to historical information stored therein and side information which origins from the standard. For example, referring back to FIG. 2, if the slot 70 (the current slot) is assigned to a first user (s1), than the next slot 72 can be assigned to the second user (s2) or the fifth user (s5). If the next slot is assigned to the fifth user (s5) than slot 78 which follows an s1 slot 76 cannot be assigned to the fifth user. It has to be assigned to the second user (s2).

If the decision controller 112 determines that the selected next slot sync-word passes the logic test of step 222, than it determines the selected next slot sync-word reliable (step 224). Otherwise, decision controller 112 determines the selected next slot sync-word unreliable (step 226).

It will be appreciated by persons skilled in the art that the present invention is not limited to what has been particularly shown and described hereinabove. Rather the scope of the present invention is defined only by the claims which follow.

I claim:

1. In a receiver receiving a signal frame in a dynamic channel, the signal frame including a plurality of slots, each of the slots including a plurality of data bits, each of the slots including a synchronization sequence, wherein at least a predetermined one of the slots is assigned for the receiver, wherein a preceding slot following the receiver assigned slot includes a varying synchronization sequence which is selected from a group of predetermined synchronization sequence postulates, a method for analyzing the channel using the preceding slot synchronization sequence, the method comprising the steps of:

calculating from said preceding slot synchronization sequence an estimated taps value for each of said synchronization sequence postulates;

calculating from said preceding step synchronization sequence a log likelihood metric value C($\underline{y},\underline{h}$) for each of said synchronization sequence postulates wherein;

y represents the signal samples; and h represents the channel taps; and selecting the synchronization word postulate having the best metric value.

2. The method according to claim 1 wherein said likelihood metric value C($\underline{y},\underline{h}$) is calculated from an expression:

$$\sum_{m=K}^{N_s} \left| y_m - \sum_{k=1}^{K} h_k \cdot S_{m-k} \right|^2,$$

wherein s represents the synchronization sequence postulates and m is a time index.

3. The method according to claim 2 wherein h is calculated from an expression selected from the group consisting of:

$$\left( \sum_{l=K}^{N_s} s_1^* s_1^t \right)^{-1} \sum_{l=K}^{N_s} s_l^* y_l; \text{ and}$$

$$\frac{1}{N_s - K} \sum_{l=K}^{N_s} s_1^* y_l,$$

wherein $N_s$ is the number of symbols in the synchronization sequence and K is the assumed number of channel taps.

4. The method according to claim 1 wherein said likelihood metric value C($\underline{y},\underline{h}$) is calculated from an expression $$\sum_{m=K}^{N_s} |y_m - \underline{h}_m \cdot s_m|^2,$$

wherein y represents the signal samples, h represents the channel taps, s represents the synchronization sequence postulates and m is a time index.

5. The method according to claim 4 wherein h is calculated from an expression selected from the group consisting of:

$$\left( \sum_{l=K}^{N_s} s_1^* s_1^t \right)^{-1} \sum_{l=K}^{N_s} s_i^* y_i; \text{ and}$$

$$\frac{1}{N_s - K} \sum_{l=K}^{N_s} s_1^* y_l,$$

wherein $N_s$ is the number of symbols in the synchronization sequence and K is the assumed number of channel taps.

6. The method according to claim 1 further comprising the steps of:

calculating a reliability value; and determining that said selected synchronization sequence postulate reliable.

7. The method according to claim 6 wherein said reliability value is calculated from the difference between the log likelihood value of the selected synchronization sequence postulate and the log likelihood values of the rest of said synchronization sequence postulates of said group of predetermined synchronization sequence postulates.

8. The method according to claim 6 wherein said selected synchronization sequence postulate is determined reliable when said reliability value exceeds a predetermined threshold value.

9. The method according to claim 6 wherein at least one synchronization sequence postulate of said group of predetermined synchronization sequence postulates is assigned for said preceding slot and excluded from at least another preceding slot, wherein said reliability value is calculated from comparing said selected synchronization sequence postulate with said at least one synchronization sequences postulate.

10. The method according to claim 1 further comprising the step of analyzing said channel according to said selected synchronization sequence postulate, thereby producing channel analysis.

11. The method according to claim 1 further comprising the step of analyzing said channel according to said selected synchronization sequence postulate and said receiver assigned slot synchronization sequence, thereby producing channel analysis.

12. The method according to claim 9 further comprising the step of decoding said data according to said channel analysis.

13. The method according to claim 10 further comprising the step of decoding said data according to said channel analysis.

* * * * *